(12) United States Patent  (10) Patent No.: US 9,047,786 B2
MaLossi et al.  (45) Date of Patent: Jun. 2, 2015

(54) CHILDREN'S EXERCISE PLAY SET

(75) Inventors: Jennifer A. MaLossi, Chenango Forks, NY (US); Ramona M. Mazzeo, Apalachin, NY (US); Victoria A. Malossi-Perry, Johnsonville, NY (US)

(73) Assignee: Brains and Brawn LLC, Binghamton, NY (US)

( * ) Notice: Subject to any disclaimer, the term of this patent is extended or adjusted under 35 U.S.C. 154(b) by 410 days.

(21) Appl. No.: 13/415,423

(22) Filed: Mar. 8, 2012

(65) Prior Publication Data

US 2013/0236866 A1    Sep. 12, 2013

(51) Int. Cl.
*G09B 19/00*    (2006.01)
*A63B 6/00*    (2006.01)

(52) U.S. Cl.
CPC . *G09B 19/00* (2013.01); *A63B 6/00* (2013.01); *G09B 19/003* (2013.01); *G09B 19/0015* (2013.01)

(58) Field of Classification Search
CPC .... G09B 19/003; G09B 19/0038; A63B 5/22; A63B 5/00
USPC ......................................................... 434/247
See application file for complete search history.

(56) References Cited

U.S. PATENT DOCUMENTS

| | | | |
|---|---|---|---|
| 3,515,385 A * | 6/1970 | Gunderson | 473/414 |
| 4,018,025 A | 4/1977 | Collette | |
| 5,156,409 A * | 10/1992 | Barnes | 273/444 |
| D367,680 S * | 3/1996 | Abbott | D21/335 |
| 5,672,123 A * | 9/1997 | Rudell et al. | 473/414 |
| 6,620,063 B1 * | 9/2003 | Benjamin | 473/414 |
| 7,465,263 B1 * | 12/2008 | Conrad et al. | 482/148 |
| 7,481,726 B2 | 1/2009 | Hawk | |
| 7,819,777 B1 | 10/2010 | Service | |
| 8,215,642 B2 * | 7/2012 | Macura et al. | 273/309 |
| 2003/0215777 A1 * | 11/2003 | Loveless | 434/247 |
| 2005/0073105 A1 * | 4/2005 | Given | 273/449 |
| 2006/0194651 A1 * | 8/2006 | Hawk | 473/414 |
| 2008/0096183 A1 | 4/2008 | Cotran | |
| 2010/0199427 A1 * | 8/2010 | Anderson | 5/420 |
| 2013/0236866 A1 * | 9/2013 | MaLossi et al. | 434/247 |

* cited by examiner

*Primary Examiner* — Robert J Utama
(74) *Attorney, Agent, or Firm* — Lee Palmateer Law Office LLC; Lee Palmateer (57) ABSTRACT

A children's instructional floor exercise apparatus for developing physical, cognitive and social skills. The apparatus has a plurality of tiles that have an anatomy indicium and an independent tile orientation indicium. When the tiles are placed in a predetermined pattern and with each tile's orientation indicia indicating the same rotational orientation, the anatomy indicia correspond to a predetermined physical movement designed to exercise a specific muscle group and develop a specific physical skill. The apparatus may be provided with written instructions describing the desired tile pattern and physical movement. Multiple apparatus may be provided in a set so as to create an obstacle course of movements, with each obstacle designed to work with and complement other obstacles in the set to provide a well-rounded exercise routine.

15 Claims, 7 Drawing Sheets

CHILDREN'S EXERCISE PLAY SET

TECHNICAL FIELD

The present invention relates to instructional children's play apparatus, and more particularly, to a play set with instructional indicia for teaching exercise movements to children and providing simultaneous cognitive challenges.

BACKGROUND OF THE INVENTION

Physical play activity is fun for children and is an important to the physical, social, and cognitive development of a child. Benefits of physical activity include, among other things, improving physical fitness, strength, agility and coordination; and developing social and cooperative learning skills when playing with other children.

Physical activity can be designed in purposeful ways so as to achieve desired results. For example, if one desires to develop a child's physical fitness and coordination for performing specific physical movements, one could design an exercise that includes those movements. Such an exercise will be more effective if it is also fun because children are more likely to engage in fun activity more often, for longer periods of time, and with greater interest levels.

Physical exercises can be designed to achieve specific results. For example, exercise movements can be designed to develop a specific muscle group or physical ability. For example, a muscle group may be the quadriceps group, abdominal muscles group, core muscles group, biceps group, triceps group, shoulders group, back group, or any other group of muscles that are located proximal to one another or that work together.

Exercises can also be designed to achieve specific physiological results. For example, plyometric exercise ("plyometrics") is an explosive type of exercise training designed to produce fast, powerful movements, and improve the functions of the nervous system. Plyometrics is used to increase the speed or force of muscular contractions, providing explosiveness for a variety of sport-specific activities. Benefits include injury prevention, power development and sprint performance amongst others. Plyometric movements, in which a muscle is loaded and then contracted in rapid sequence, use the strength, elasticity and innervation of muscle and surrounding tissues to jump higher, run faster, throw farther, or hit harder, depending on the desired training goal.

Calisthenics are a form of aerobic exercise consisting of a variety of simple, often rhythmic, movements. They are intended to increase body strength and flexibility with movements such as bending, jumping, swinging, twisting or kicking, using only one's body weight for resistance. Calisthenics when performed vigorously and with variety can benefit both muscular and cardiovascular fitness, in addition to improving psychomotor skills such as balance, agility and coordination.

Cardiovascular exercise is exercise that raises your heart rate, making a stronger heart and stronger cardiovascular system, and develops more capillaries, which deliver more oxygen to cells in your muscles. This enables your cells to burn more fat during both exercise and inactivity. Cardiovascular exercise uses large muscle movement over a sustained period of time.

Strength training is the use of resistance to muscular contraction to build the strength, anaerobic endurance, and size of skeletal muscles. There are many different methods of strength training, but the present invention promotes movements that use the person's body weight as the source of resistance. Strength training can provide significant functional benefits and improvement in overall health and well-being, including increased bone, muscle, tendon and ligament strength and toughness, improved joint function, reduced potential for injury, increased bone density, a temporary increase in metabolism, improved cardiac function, and elevated HDL (good) cholesterol.

Balancing exercises develop a person's ability to maintain the center of gravity of his or her body. Balancing requires concurrent processing of inputs from multiple senses, including equilibrioception (from the vestibular system), vision, and perception of pressure and proprioception (from the somatosensory system), while the motor system simultaneously controls muscle actions. The senses must detect changes of body position with respect to the base.

Stretching is a form of physical exercise in which a specific skeletal muscle (or muscle group) is deliberately elongated. Stretching exercises increase flexibility and athletic performance and reduce injury. Yoga involves the stretching of major muscle groups.

Educational exercises and activities designed specifically for cognitive and social skill development can be combined with or incorporated into fun physical activities, thus creating a hybrid physical/educational activity. Children may be more likely to engage in the educational activity when it is part of such a hybrid activity, particularly when the hybrid activity is perceived by the child predominantly as a fun physical play activity.

Children are also more likely to engage in activities that they can do independently of adult involvement.

There are many traditional children's games, such as Duck, Duck, Goose, Musical Chairs, Hopscotch and Ring around the Rosy, that are fun for children, provide physical activity, social interaction, and may provide limited cognitive challenges such as counting. However, these games are limited in the cognitive challenges and physical exercises that they can provide. These games are not designed to teach or employ targeted physical movements to develop targeted physical abilities, and do not incorporate methods or apparatus adapted to instruct such movements. There is a need for an improved educational children's play set that provides children from three to six years of age with different cognitive challenges, while simultaneously engaging them in exercise and cooperative play that involves isolated body movements designed to exercise and develop specific muscle groups and specific physical abilities. There is a need for such an improved play set that is also self-instructive of new body movements, that can be used by young children with minimal adult intervention, and that uses visual indicia that are simple for young children to understand.

SUMMARY OF THE INVENTION

In a first aspect, the present invention provides an instructional floor exercise apparatus that has a plurality of tiles. At least two of the tiles each have an anatomy indicium and a tile orientation indicium. Each tile's tile orientation indicium indicates the rotational orientation of the tile, and is provided for indicating the rotational orientation of the tile. When the tiles are placed in a predetermined spatial relation to one another and in rotational orientation such that the orientation indicia indicate the same rotational orientation for each tile, the anatomy indicia form a pattern that corresponds to a predetermined physical movement. The apparatus may have written instructions with a description of the desired spatial relation of the plurality of tiles. The written instructions may also have a description of the physical movement. The physical movements may be any predetermined movement, may be a novel and original movement, may be a commonly known movement, and may be a traditional children's play activity.

In a second aspect, the present invention provides an instructional floor exercise apparatus having a plurality of tiles that each have a means for releasable attachment to adjacent tiles. At least two of the tiles each have an anatomy indicium and a tile orientation indicium. Each tile's tile orientation indicium indicates the rotational orientation of the tile. When tiles of the plurality of tiles are releasably attached to other tiles of the plurality of tiles in a predetermined assembly configuration with the orientation indicia of each tile indicating the same rotational orientation, the anatomy indicia form a pattern that corresponds to a predetermined physical movement.

In a third aspect, the present invention provides a method of providing exercise instruction. The method comprises the steps of providing a plurality of tiles wherein at least two of the plurality of tiles each comprise an anatomy indicium and a tile orientation indicium. The tile orientation indicium is for indicating the rotational orientation of the tile. The method further includes placing the plurality of tiles in a predetermined spatial relation to one another with the orientation indicia indicating the same rotational orientation so that the anatomy indicia form a pattern that corresponds to a predetermined physical movement.

In a fourth aspect, the present invention provides an obstacle course comprising a plurality of the above described apparatus wherein the physical movement of at least one of the apparatus is different than the physical movement of at least one of the other apparatus such that the obstacle course comprises a plurality of different physical movements.

In a fifth aspect, the present invention provides a method of exercising and learning cognitive and social skills. The method comprises the steps of receiving a play set, optionally contained in a carrying bag, that comprises at least one obstacle and instructions describing the desired assembly of the at least one obstacle. The at least one obstacle comprises a plurality of tiles. At least two of the plurality of tiles each comprise an anatomy indicium and a tile orientation indicium. Other steps of the method include reviewing the instructions and assembling each of the at least one obstacle by orienting each tile in the obstacle so that the orientation indicium of every tile in the obstacle indicates uniform rotational orientation with all other tiles in the obstacle and arranging the tiles of each obstacle in proper sequence and relation to each other tile in the obstacle in accordance with the instructions. The anatomy indicia of each obstacle form a pattern that corresponds to a predetermined physical movement that is designed to exercise a specific muscle group and develop a specific physical skill when the obstacle is so assembled, and each of the at least one obstacle are designed to complement each other to create a well-rounded exercise routine. Additional steps of the method are reviewing the obstacle movement instructions for each obstacle, which instructions teach the predetermined movement for each obstacle, and performing the movement of the at least one obstacle. The foregoing method may be performed by one individual or by multiple individuals working together. Optionally, all of the at least one obstacles may be assembled together to form an obstacle course of multiple obstacles, and the multiple movements can be performed in sequence.

These, and other features and advantages of this invention will become apparent from the following detailed description of the various aspects of the invention taken in conjunction with the accompanying drawings.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

DETAILED DESCRIPTION OF THE INVENTION

The present invention overcomes some of the limitations of currently available children's physical exercise games. It provides an educational children's play set designed to provide children aged 3-6 a cognitive challenge, while simultaneously engaging them in exercise and cooperative play. The set contains multiple "obstacles", which may also be referred to herein as movement assemblies. Children must assemble each obstacle by placing the tiles in certain spatial and rotational orientation with respect to one another. In one embodiment, Children must put each obstacle together by joining together interlocking tiles. The tiles are branded with images of hands, feet, knees and other cues so that children aged 3-6 are provided with a visual model, scaffolding them as they learn movements and to manipulate their bodies into different positions. Obstacles are each designed to complement each other and work together with other obstacles within a set of obstacles to exercise the major muscle groups in a balanced fashion, creating a well-rounded exercise routine. For example, a set of obstacles may comprise three obstacles, each designed differently for a different purpose, but each designed to work with and compliment the other two obstacles to provide a well-rounded exercise of multiple major muscle groups. The play set makes it possible to teach specific movements designed with attention to specific exercise physiology principles, and tailored to meet specific objectives related thereto. The play set of the present invention builds strength, agility, coordination, endurance, gross motor skills, and cooperative learning skills. The play set is easy for young children to use independent of adult intervention or involvement.

Play sets of the present invention may be designed around themes and sub-themes that are interesting, fun and educational for children. Four examples of play sets designed around sub-themes of an animal theme, are: the Splish Splash set has a water habitat theme with three obstacles called the Crab Crawl, Frog Leap, and Flamingo Walk; the Furry Friends set has a furry animal theme with the Kitten Spin, Donkey Kick, and Bunny Hop obstacles; the Getting Buggy set has a spider/insect theme with the Spider Scramble, Lady Bug Shuffle and Butterfly Balance obstacles; and the Wild Life set has an exotic wild animal theme with the Gorilla Stomp, Giraffe Stretch, Kangaroo Bounce obstacles. Multiple play sets can form a game series, as in the foregoing example the Splish Splash set, Furry Friends set, Getting Buggy set, and Wild Life set form an animal game series. These themes also promote cognitive development and learning, as in the foregoing example that promotes learning about animals and animal habitats. There are unlimited potential themes. Other examples of themes include a "boot camp" theme, "princess" theme, and "sports" theme.

The play set of the present invention comprises multiple "obstacles" that can be used together to make up an obstacle course. Each "obstacle" comprises multiple tiles, all of which may have a mark that indicates rotational orientation of the tile (also referred to herein as an "orientation indicium"), and at least some of which have a mark in the image of a hand, foot, or other anatomical feature (also referred to herein as an "anatomy indicium"). Each obstacle is designed to correspond to a predetermined exercise movement, and has the proper number of tiles with proper anatomy indicium marked thereon so that together they form a pattern of anatomy indicia that corresponds to a predetermined exercise movement when they are arranged in a predetermined spatial relation to one another with their respective orientation indicium all indicating the same rotational orientation.

The play set may be provided with easy-to-understand written instructions that may comprise obstacle assembly instructions, illustrations of the assembled obstacle, a description of the exercise movement, and illustrations of a child performing the exercise movement. The instruction provides child-friendly picture directions, allowing toddlers themselves to take the leading role in putting together their obstacles and obstacle course. The anatomy indicia provide a visual indication to the child where he or she should put the corresponding parts of his or tier body in the performance of the movement—for example, hand and feet indicium indicate where to put his or her hands and feet in the performance of the movement. Although the anatomy indicia are primarily described as indicia of hands and feet, it is understood that the anatomy indicia could indicate knees, elbows, heads, shoulders, forearms, buttocks, and other parts of the body. The singular "indicium" may include more than one part of the body, such as a "two-feet" indicium that includes a right and a left foot. The written instructions describe the predetermined movement, and when the obstacle is assembled according to the instructions, the pattern of anatomy indicia corresponds to the predetermined movement.

In one application of the present invention, the anatomy indicia are targets for the child to place his or her hands or feet. In reference to FIG. 6 for example, in this application a child would crouch with her hands and feet all placed on the corresponding anatomy indicium in tiles 13 and 14, and would leap forward, landing her hands and feet in a crouched position on the next corresponding anatomy indicium. Thus, the movement is more controlled and controllable. Additional spacer tiles, different size spacer tiles, or different size indicium tiles can be used to control the leap length. Thus, the invention is effective at promoting or adapting to the advancement of a child's ability level. Different shaped spacer tiles or indicium tiles can be used to change the direction of propagation through the movement, such as creating a bend in the path of the movement.

In another application, the anatomy indicia are general visual cues of the exercise movement design, and the child may perform the movement without concern for the exact location or number of indicia, but with general adherence to the design of the movement. In reference to FIG. 6 for example, in this application a child would crouch on his hands and feet, and would leap forward, landing on his hands and feet in a crouched position, but his hands and feet need not be on the corresponding indicia, and the number and length of leaps need not adhere to the indicia.

The play set may comprise multiple obstacles. For example, a play set may include three obstacles, each of which corresponds to a different movement, and all of which are designed to work together to provide a well-rounded exercise involving multiple muscle groups.

The movements may be any movement or combination of movements that children or adults are capable of performing. The movements may mimic animal movements, such as a frog leap. The movements may comprise common exercise movements, callisthenic movements, or yoga movements.

Each obstacle requires assembly, providing the child with a cognitive challenge. In one embodiment, the tiles comprise interlocking edges, which edges comprise alternating extensions and recesses of corresponding shape and size so that adjacent tiles can be assembled together like puzzle pieces. The assembly process fulfills an objective of the present invention to provide a cognitive exercise in which the child is challenged to read and understand the printed instructions and then carry out the instructions by disposing the tiles in proper arrangement according to the instructions. Printed instructions may include words and may include graphical illustrations. The term "read" is not limited to reading words and letters, but also encompasses deciphering graphical illustrations and images and the like. Thus, the invention develops the child's ability and skill to interpret and carry out written instructions, and cognitive skills and abilities necessary to properly manipulate, arrange, and assemble several pieces of an apparatus together.

The multiple obstacles making up a set can be put together in any order, allowing children a variety in the pattern of movements. For example, the three obstacles—(1) Frog Leap, (2) Flamingo Walk, and (3) Crab Crawl—of the Splish Splash theme set, can be assembled in order 1-2-3, 1-3-2, 2-1-3, 2-3-1, 3-1-2, or 3-2-1. In addition, the obstacles may be transitioned in different directions. For example, they may be arranged so as to create a strait path of progression through all three movements, or the path of progression may change direction at the transition from one obstacle to the next. One such arrangement would be Frog Leap, left turn onto Flamingo Walk, and right turn onto Crap Crawl. Various numbers and shapes of transition tiles may be used to facilitate any transition shape. In a more advanced application of the present invention, the child may even put a bend within an obstacle by rotating a tile out of rotational synchronization with the predetermined design of the obstacle. Thus, each set provides a variety of movement sequences and path shapes, which makes the play set more interesting and fun. This flexibility allows children freedom to exercise discretion and creativity, which exercises the mind and also makes the play set more interesting and fun.

Figure 9:
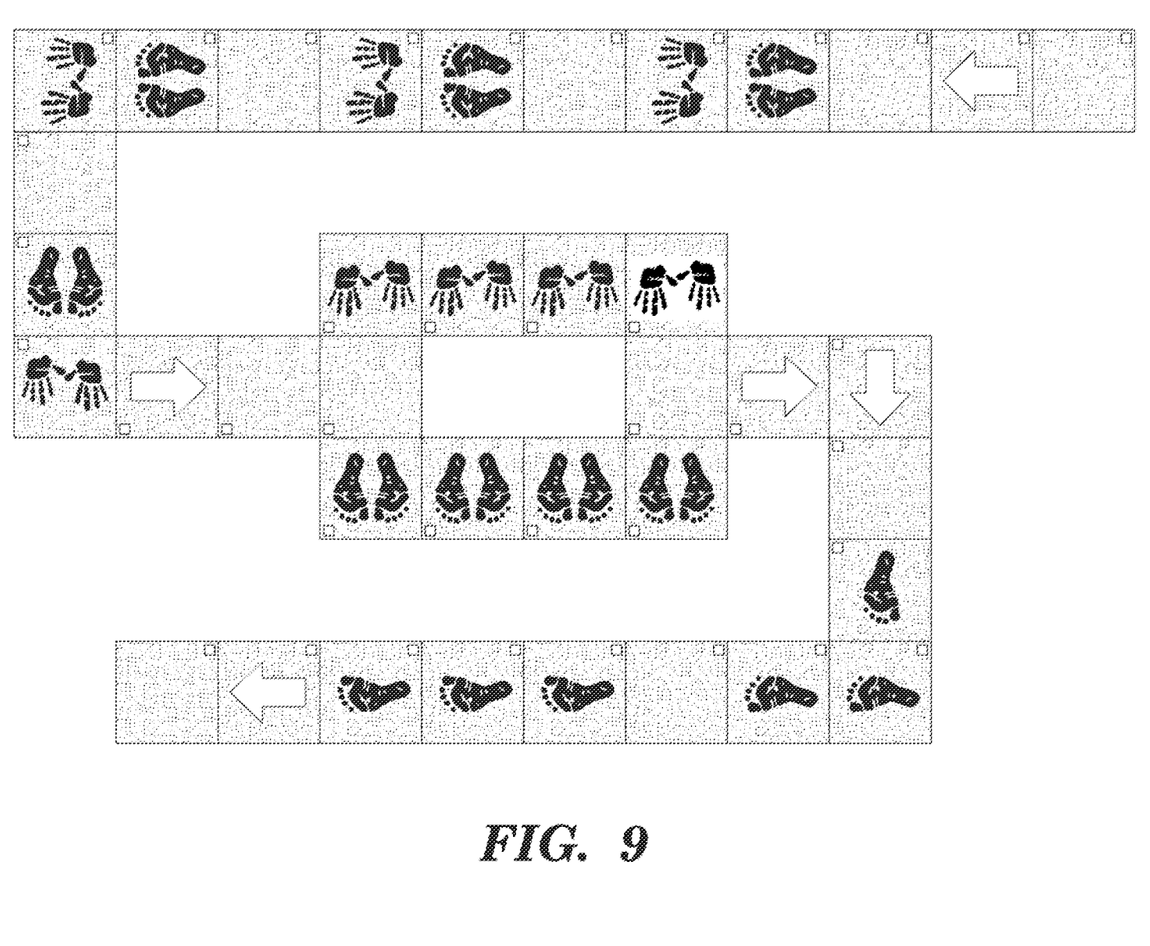
FIG. 9 is a top view of an assembly of multiple obstacles in accordance with the present invention.

FIG. 9 illustrates an example of an assembled Splish Splash obstacle set, with discretionary directional changes cause by altering the tile orientations.

Obstacles could be repeated. For example, in reference to the Splish Splash set, an obstacle course could be created from a 1-2-1-3 combination, where Frog Leap is included twice. Multiple sets can also be used together to create bigger and more varied obstacle courses. Obstacles from one set can be used with obstacles of another set. Obstacle courses can extend from room to room, through doorways, from indoors to outdoors, under tables, and limitless other possibilities.

With the modular aspect of the obstacles and the transition options, there is no limit to the possibilities.

Figure 1:
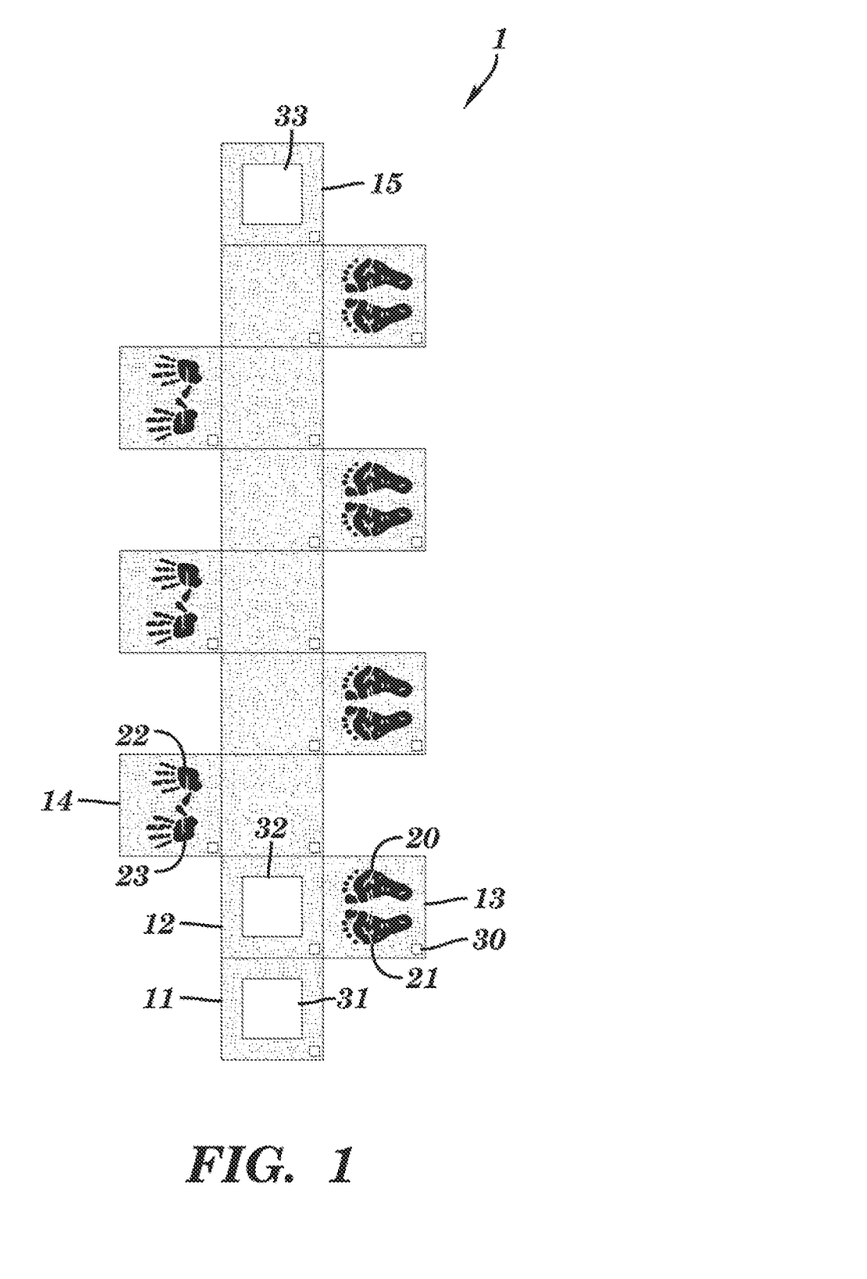
FIG. 1 is a top view of an obstacle in accordance with the present invention, which corresponds to the Donkey Kick movement.
Figure 2:
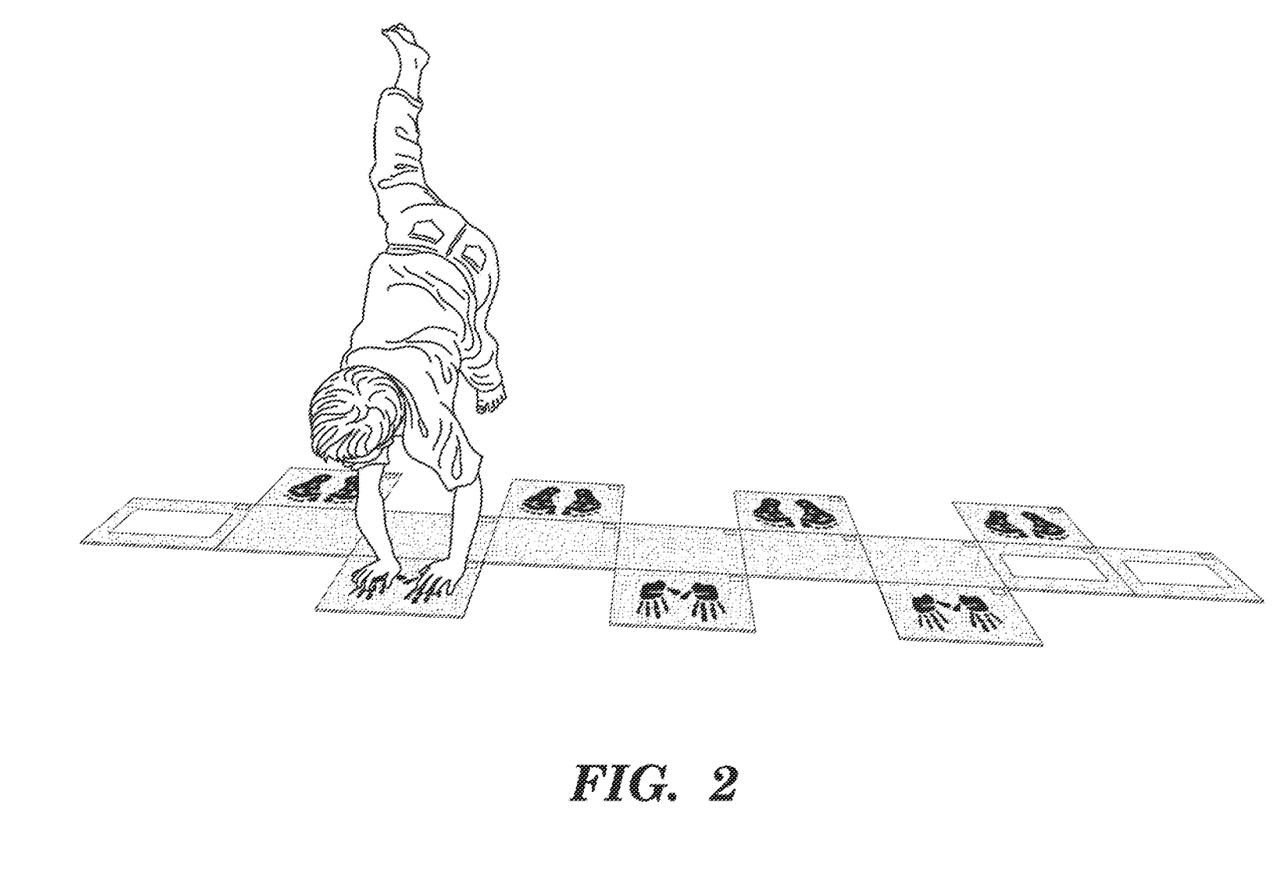
FIG. 2 is a perspective view of the apparatus of FIG. 1, shown in use by a child.
Figure 3:
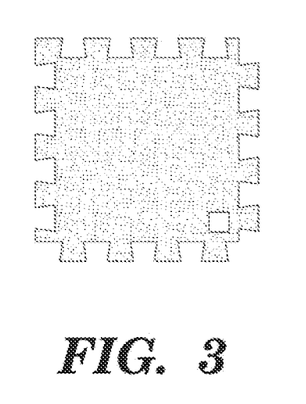
FIG. 3 is a tile of the present invention.
Figure 4:
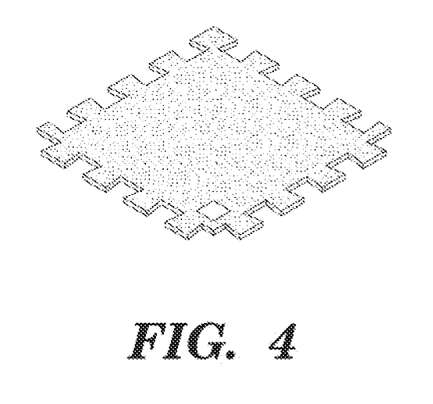
FIG. 4 is a perspective view of the tile of FIG. 3.

FIGS. 1 through 9 illustrate various embodiments of floor exercise apparatus in accordance with the present invention. With reference to FIG. 1, the apparatus 1 comprises multiple spacer tiles 12, multiple two-foot tiles 13, multiple two-hand tiles 14, a first transition tile 11, and a second transition tile 15. The transition tiles and spacer tiles may have fields 31, 32 and 33, respectively, that contain images other than an anatomy indicium. The apparatus of FIG. 1 corresponds to a movement referred to herein as the "Donkey Kick" obstacle that is designed as a cardiovascular and plyometric exercise, involving a squat leap with forward motion using hip and knee extension and flexion, and focused primarily on the quadriceps, hamstrings and calves muscle group. FIG. 2 illustrates a child in the process of performing the movement associated with FIG. 1. In the Donkey Kick movement, the child's body faces in the direction of the feet indicia on the two-foot tiles, but the progression through the obstacle is lateral to the child. As with all of the obstacle embodiments herein, the obstacle movement can be reversed so that repeated back-and-forth laps can be performed. For example, the child could perform the Donkey Kick in a left-to-right direction until she reaches the right-side extreme, and return in a right-to-left direction to the left-side extreme, and repeat as many times as desired.

The first and second transition tiles may be provided to extend the movement assembly for any purpose, including, for example, for providing a means for connecting one obstacle to another. Any number, shape or size of transition tiles may be used.

In other embodiments, the tiles may be spaced apart without mechanical connection to one another.

The tiles may be made of any suitable material. The tiles may be hard or soft. The tiles may comprise mats. The tiles may comprise any of the many commercially available tile materials, such as any of the materials commonly used for child play mats. The tiles may be colorful, soft, lightweight, and washable. The tiles may comprise soft, durable material such as rubber or foam. The tiles may comprise carpet tiles. Soft tiles enhance safety and comfort, and protect against injury by providing cushioning of hard floor surfaces.

The tiles may be in any shape or size. The tiles may have anatomy indicium and orientation indicium on one or both faces of the tile so that the tile can be used with either face facing away from the surface on which it is placed. Each face may have the same indicia or different indicia from the other face. Each face may have the same or different color than the other face.

Rotational Orientation Indicia

All of the tiles in FIG. 1 have rotational orientation indicia 30. The orientation indicia may comprise any visible image, symbol, mark, thing or object affixed to the tile. The orientation indicia 30 of the tiles are uniformly located on all of the tiles. The orientation indicia 30 in FIG. 1 are all shown in the lower-right quadrant of the face of the tile. The location of the orientation indicia on the tile indicates the proper rotational orientation of the tile. For example, the tiles of FIG. 1 are in the desired orientation when all of the tiles are oriented rotationally such that their respective orientation indicia are in the lower right portion of the tile.

Tiles that may be assembled in any orientation without affecting the pattern of anatomy indicia may be provided without orientation indicia. For example, a square spacer tile with no anatomy indicia may be provided without an orientation indicium. For another example, a tile with a anatomy indicium that has neutral directional indication may be provided without an orientation indicium.

Although in the embodiment shown in FIG. 1, the orientation indicia was applied on the lower right portion of each tile, orientation indicia may be placed elsewhere on each tile as long as such placement is capable of indicating rotational orientation. For example, orientation indicia could be uniformly placed on the upper-right, upper-middle, upper-left, middle-left, lower-left, and lower-middle portion of a rectangular tile.

The present invention provides uniform orientation indicia that instruct orientation of all of the tiles with respect to one another, without need to reference an external reference, i.e., without reference to something external to the play set. The orientation indicia may also be used to instruct orientation with respect to any reference external to the play set, such as a wall or other object.

Instruction could be provided to put a first tile down in a random orientation or any orientation chosen by the child, and assemble all other tiles in the same rotational orientation as the first tile without regard to any other reference. Once the assembly is fully assembled in that manner, forming an obstacle, the entire obstacle can then be oriented together in any chosen orientation with respect to an external reference.

Alternatively, instruction could be given to align the first tile in a particular orientation with respect to an external reference, and then assemble all other tiles with the same orientation. Thus, when complete, the entire assembly will be in the desired orientation. The term "external reference" or like term could be any reference external to the play set tiles, such as a wall, an object, a floor pattern, a person, or even the child who is assembling and playing with the play set. It could also be a direction, such as a compass direction; or a forward, backward, left, right, or lateral direction; or an angular direction, such as any of the 360 degrees around a point or corresponding to the sweep of the hands around an analog clock.

Alternatively or in addition to being located on a predetermined portion of a tile, the orientation indicia can also have shape, color, word, symbol or other feature that is, by itself, capable of indicating desired rotational orientation of the tile. For example, orientation indicia in the shape of an arrow would indicate that the tiles are all properly rotated with respect to one another or to an external fixed reference when all arrows are pointed in the same direction.

Figure 8:
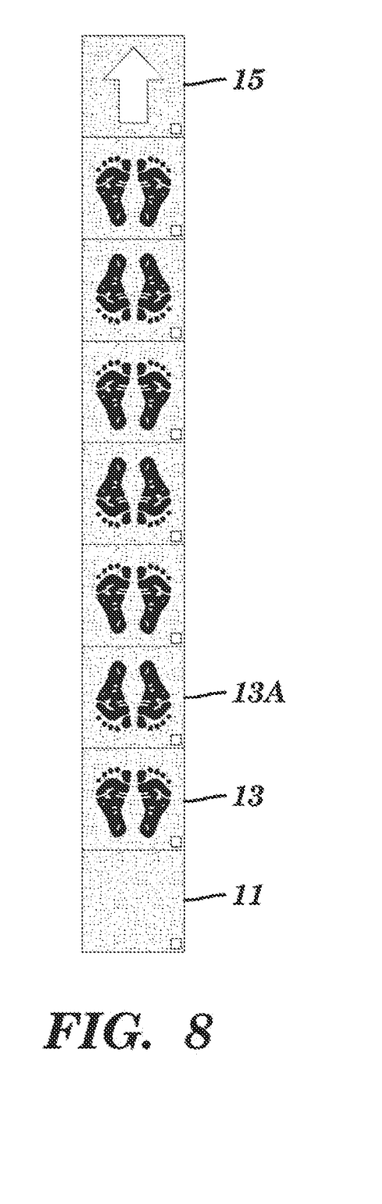
FIG. 8 is a top view of another obstacle in accordance with the present invention, which corresponds to the Kitten Spin movement.

The rotational orientation indicium may be separate in concept from the anatomy indicium. This separation between the concept of tile orientation and the concept of anatomy indicium provides important utility. For example, an anatomy indicium such as a foot may suggest a tile orientation with the toes forward of the heel in the direction of the movement, where in fact a different orientation for that tile is desired. The foregoing may be more readily appreciated in reference to the movement assembly shown in FIG. 8, in which multiple tiles that have the same shape and same anatomy indicium are made distinct by the independent rotational orientation indicium. In FIG. 8, a square tile having a two-feet anatomy indicium indicates toes forward in the movement progression by placing the orientation indicium in one quadrant of the tile, while another tile of the same shape and anatomy indicium indicates heel forward in the direction of the movement simply by having an orientation indicium in the opposite quadrant of the tile. Thus, a tile of one shape and anatomy indicium can be made to establish different anatomy orientation in different parts of the obstacle merely by changing the location of the rotational orientation indicium on the tile.

The tile orientation, anatomy orientation, and direction of progression through the movement may thus be separately controlled in the present invention.

Not only does the separation of concept between orientation indicia and anatomy indicia provide utility in the use of the present invention, but it also provides utility in the manufacture thereof because the two features can be independently affixed in entirely separate processes or in the same process and can be individually optimized or optimized together.

The rotational orientation indicium may be independent of the direction of movement of the child in his or her progression through the movement. In some embodiments of the present invention, a child need not even concern him or herself with the orientation indicium beyond the assembly activity. Once the movement assembly is assembled, the orientation indicia may, in some embodiments, be disregarded entirely.

This separation is particularly important for young children because it permits a child to isolate the concepts and enables the child to more easily manage the concepts, which simplifies the assembly activity. The child can focus exclusively on the orientation indicia to rotationally orient tiles, without simultaneously processing other aspects of the obstacle, such as the anatomy orientation or the spatial or sequential arrangement of the tiles. Once the rotational variable is removed from the assembly process, the child can then concentrate on other aspects of the assembly. As a result, children will experience more success and less frustration. Thus, the apparatus of the present invention is more enjoyable and a more effective teaching tool than apparatus and games of the prior art.

The rotational orientation indicia of the present invention overcome limitations of indicia that depend on the physical perspective of the viewer in order to efficiently convey meaning to the viewer. For example, words, letters and numbers are less efficient at communicating meaning to a viewer with respect to whom the words, letters or numbers appear upside down or sideways. However, the orientation indicia of the present invention communicate meaning equally as efficiently regardless of the perspective of the viewer. A child can readily and immediately comprehend that all the tiles are uniformly oriented simply by observing that the rotational orientation indicium are uniformly oriented, regardless of the perspective of the child. Likewise, the indicia will readily and immediately communicate tile miss-orientation, and the amount of rotational correction necessary to achieve the desired rotational orientation. These communication efficiencies are particularly important to young children or other people with limited cognitive development.

Although separate in concept, the orientation indicium may be located anywhere on the tile, even co-located with or integral to the anatomy indicium.

Anatomy Indicium

The anatomy indicia may be an image resembling a part of the body, such as an image of a human hand or foot. They may resemble animal anatomy, such as that of an animal that corresponds to the theme of the movement. For example, the indicium could be in the shape of frog feet for the "Frog Leap" theme, or flamingo feet for the "Flamingo Walk" theme. The anatomy indicium may also be any letter, word, symbol, mark or device, and may even have tactical features for the visually impaired, such as brail. The indicium may be a physical feature of the tile material and may be formed by any suitable mechanical or chemical process, such as by heat branding, chemical etching, molding, mechanical pressing, or machining. The indicium may also be in the form of ink, paint, stain, dye, or the like and be applied to the tile surface by any suitable means. The indicium may also be in the form of a decal or an adhesive material or sticker affixed to the surface of the tile.

Interlocking Means

The Tiles of FIGS. 1, 2 and 6-9 are shown without means for attachment to adjacent tiles. In an alternate embodiment, the tiles in FIG. 1 have features enabling them to be releasably attachable to one another, such as interlocking edges illustrated in FIG. 3 and FIG. 4 or hook and loop fasteners, such as Velcro® brand hook and loop fasteners. Any suitable means may be used to releasably attach adjacent tiles to one another. An advantage of the interlocking edge means is that it is self-aligning and self-indexing so as to ensure proper alignment and positioning.

Exemplary Embodiments

Figure 5:
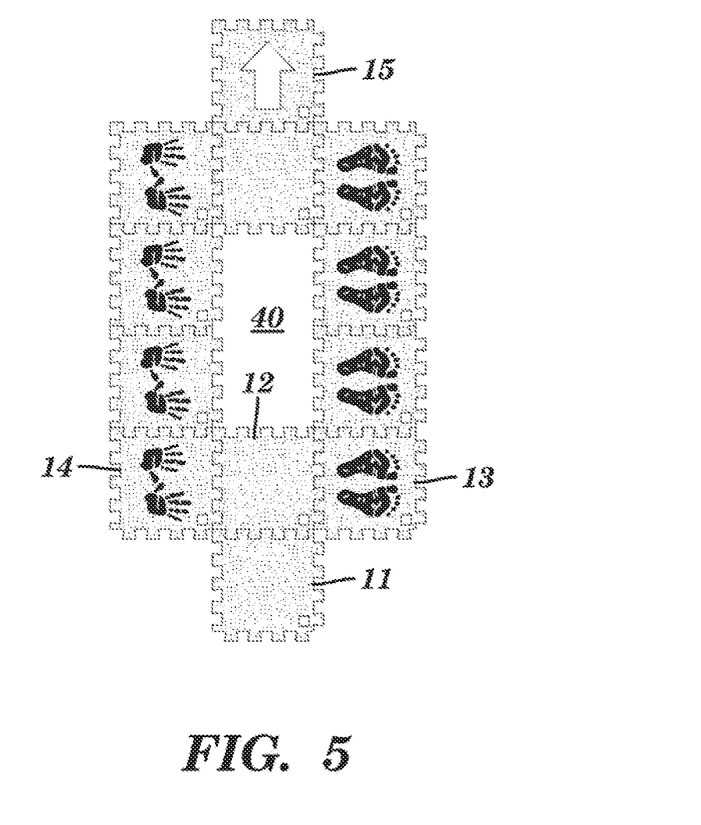
FIG. 5 is a top view of another obstacle in accordance with the present invention, which corresponds to the Crab Crawl movement.

With reference to FIG. 5, the apparatus comprises spacer tiles 12, two-foot tiles 13, two-hand tiles 14, and optionally a first transition tile 11, and a second transition tile 15. A gap 40 is formed by the assembly of tiles. In this and other embodiments, the field may comprise the shape of an arrow or other indicia that indicates a desired direction of movement through the obstacle. FIG. 5 corresponds to a movement called herein the "Crab Crawl" that is designed as a cardiovascular and strength training exercise, involving a reverse table top position with hip extension and knee flexion with upper extremity recruitment, and focused primarily on the Chest, triceps, deltoids, hamstrings, quadriceps and gluteal muscle groups.

Figure 6:
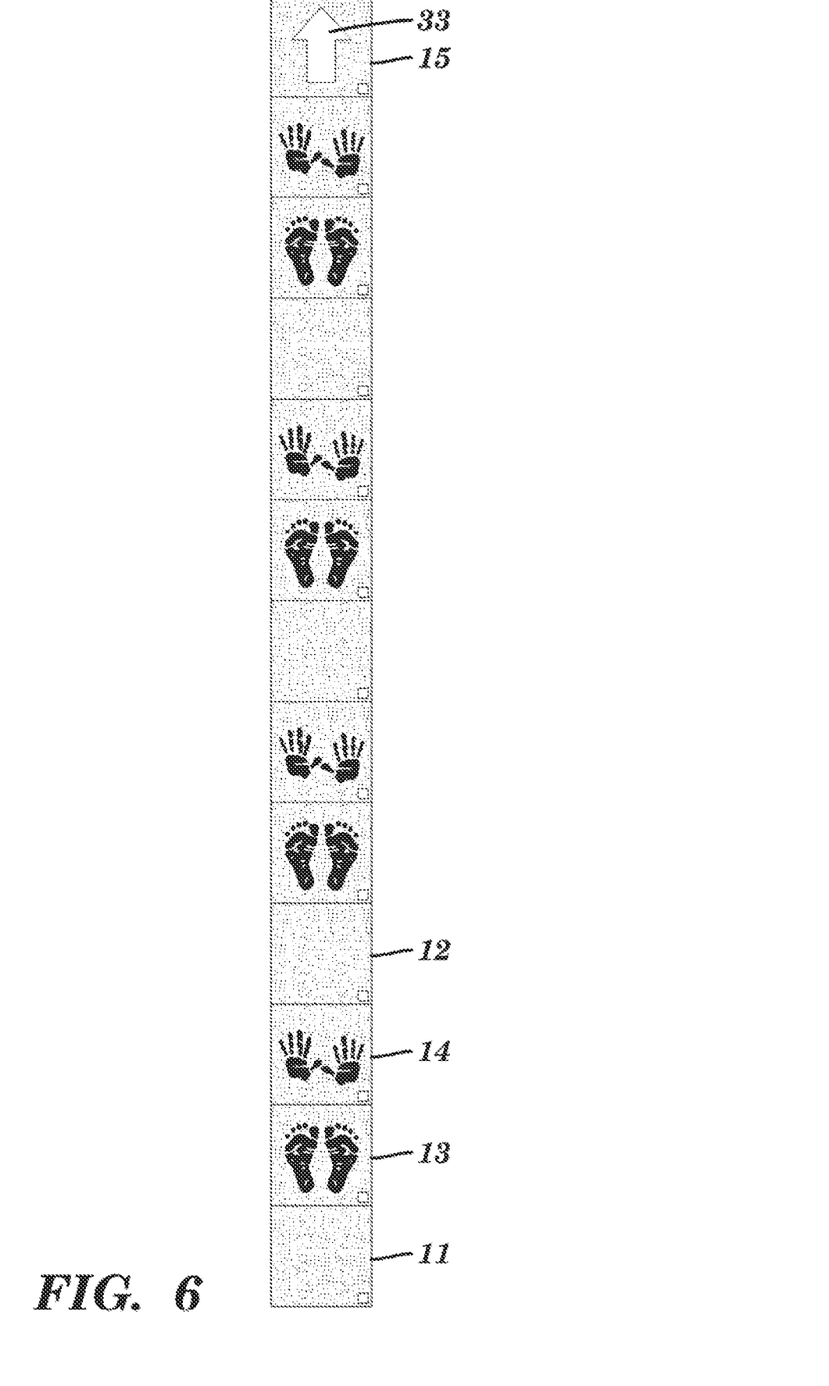
FIG. 6 is a top view of another obstacle in accordance with the present invention, which corresponds to the Frog Leap movement.

With reference to FIG. 6, the apparatus comprises spacer tiles 12, two-foot tiles 13, two-hand tiles 14, and optionally a first transition tile 11, and a second transition tile 15. FIG. 6 corresponds to a movement called herein the "Frog Leap" that is designed as a cardiovascular and plyometric exercise, involving squat leaps to create lower body strength through hip and knee flexion followed by hip and knee extension, and focused primarily on the quadriceps, hamstrings, calves and gluteal muscle groups.

Figure 7:
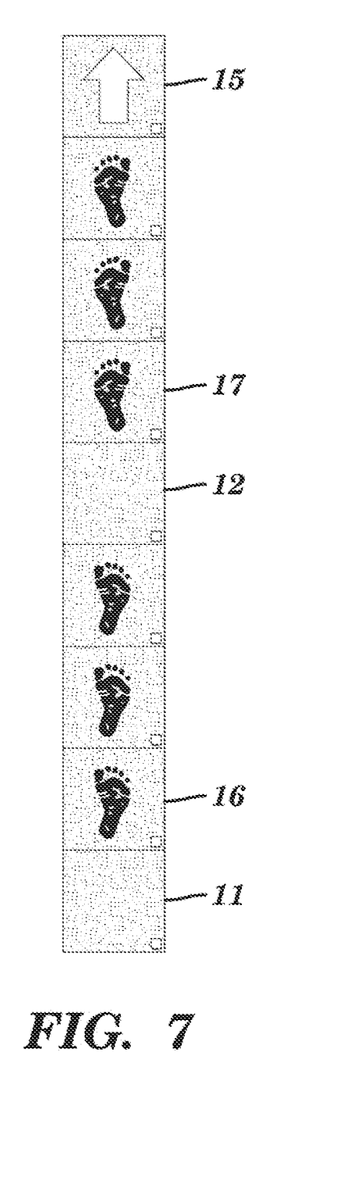
FIG. 7 is a top view of another obstacle in accordance with the present invention, which corresponds to the Flamingo Walk movement.

With reference to FIG. 7, the apparatus comprises a spacer tile 12, right-foot tiles 16, left-foot tiles 17, and optionally a first transition tile 11, and a second transition tile 15. FIG. 7 corresponds to a movement called herein the "Flamingo Walk" that is designed as a balance and strength training exercise, involving alternating left and right hip and knee flexion, then extension, and focused primarily on the abdominal and back muscle groups.

With reference to FIG. 8, the apparatus comprises two-foot tiles 13, opposite two-foot tiles 13A, and optionally a first transition tile 11, and a second transition tile 15. FIG. 8 corresponds to a movement called herein the "Kitten Spin" that is designed as a balance exercise, involving balance and spinal twist forward motion, and focused primarily on the abdominal and back muscle groups.

Method of Use

In one embodiment, each play set is packaged in a reusable, lightweight, carrying bag for neat, organized transport and storage. Each obstacle is separately packaged in its own designated bag or shrink-wrapping, and child-friendly photo instructions are provided on the back of each obstacle package. Alternatively, the photo instructions may be provided as a package insert on a piece of paper or other suitable medium. The photo instructions show an image of the assembled obstacle. A separate, more detailed set of written instructions may also be provided in the carrying bag. The carrying bag, containing the play set, is provided to a child. It is an objective of the present invention to provide children with the task and opportunity to discover and figure out how to use the play set, which adds to the fun of the activity and provides opportunity for development of cognitive skills and cooperative learning and social activity when used in groups. The child opens the carrying bag and removes its contents. The child reviews the instructions. The child removes an obstacle from its package and assembles it in accordance with the instructions. The child orients each tile so that the orientation indicium of every tile indicates uniform rotational orientation with all other tiles. For example, indicia comprising arrows will all be pointed in the same direction, or indicia comprising marks in corner portions of square tiles will all be located in the same quadrant, such as the lower right-hand quadrant of their respective tiles. The child arranges the tiles in proper sequence and relation to one another in accordance with the instructions. Tiles with releasably attachable means are assembled into proper configuration in accordance with the instructions. In the embodiment comprising interlocking tiles, the tiles are assembled like a puzzle by engaging the interlocking edges with one another. In the embodiment comprising Velcro® attachment means, the tiles are assembled by aligning the corresponding hook portions and loop portions of the Velcro® joint, and pressing them together.

The child reviews the obstacle movement illustrations that teach the predetermined movement design. The child then performs the movement.

The steps are repeated for each obstacle. The child may assemble the obstacles together to form an obstacle course and perform the obstacles movements in succession.

Optionally a timer is provided for measuring the time it takes for the child to finish an obstacle or obstacle course.

Another objective of the present invention is to teach children organization skills and responsibility for cleaning up after play. Thus, a further step in the method of the present invention is for the child to disassemble the obstacles and return them to their respective individual packaging, if any, and place all components of the play set back in the carrying bag. The carrying bag may be configured so as to require the obstacle pieces to be neatly and efficiently organized in order to fit back in.

Although the foregoing method of use is described in relation to a single child, it is understood that multiple children can perform the steps together. Use of the play set of the present invention is not limited to the foregoing exact sequence, and permissible sequence variations are obvious. The photo instructions may comprise photographic images of the obstacle, or may comprise any form of illustration, such as drawings and diagrams.

The play set of the present invention has utility beyond children's exercise and play. It has utility in the field of physical rehabilitation. The obstacles can be used to instruct common physical rehabilitation movements. For example, the tiles can be used to map footsteps for someone learning to walk in rehabilitation from a stroke or exercising after a traumatic injury. Different size tiles can be used, or spacers inserted, to increase the stride length as the patient improves and to provide incremental changes to incentivize the patient to strive for improvement. This allows for the obstacle to be adapted to various ability levels or to advancements in ability level. Many other variations are obvious.

While the invention has been particularly shown and described with reference to certain embodiments, it will be understood by those skilled in the art that various changes in form and details may be made to the invention without departing from the spirit and scope of the invention as described in the following claims.

The invention claimed is:

1. An instructional floor exercise apparatus adapted to pattern a predetermined physical movement comprising:
 a plurality of tiles;
 wherein at least two of the plurality of tiles each comprise an anatomy indicium and a tile orientation indicium, which said orientation indicia each have in common at least one uniform aspect adapted to indicate the rotational orientation of the tile; and
 wherein the anatomy indicia form a pattern that corresponds to the predetermined physical movement when the tiles are placed in a predetermined spatial relation to one another and in rotational orientation such that the orientation indicia of all tiles having an orientation indicium indicate the same rotational orientation.

2. The instructional floor exercise apparatus of claim 1 further comprising separate written instructions comprising a description of the predetermined physical movement and desired spatial relation of the plurality of tiles.

3. The instructional floor exercise apparatus of claim 1 wherein each tile orientation indicium is uniform with each other tile orientation indicium.

4. The instructional floor exercise apparatus of claim 1 wherein the physical movement comprises an animal movement.

5. The instructional floor exercise apparatus of claim 1 wherein the physical movement is designed to exercise a specific muscle group.

6. The instructional floor exercise apparatus of claim 1 wherein the physical movement is designed to develop a specific physical skill.

7. The instructional floor exercise apparatus of claim 1 wherein at least one of the plurality of tiles is a spacer.

8. The instructional floor exercise apparatus of claim 1 wherein said plurality of tiles are releasably attachable to adjacent tiles, and the anatomy indicia form a pattern that corresponds to a predetermined physical movement when the tiles of the plurality of tiles are releasably attached to other tiles of the plurality of tiles in a predetermined assembly configuration with the orientation indicia indicating the same rotational orientation.

9. An obstacle course comprising:
 a plurality of instructional floor exercise apparatuses each adapted to pattern a predetermined physical movement and each comprising;
 a plurality of tiles;
 wherein at least two of the plurality of tiles each comprise an anatomy indicium and a tile orientation indicium, which said orientation indicia each have in common at least one uniform aspect adapted to indicate the rotational orientation of the tile; and
 wherein said plurality of tiles are releasably attachable to adjacent tiles, and the anatomy indicia form a pattern that corresponds to a predetermined physical movement when the tiles of the plurality of tiles are releasably attached to other tiles of the plurality of tiles in a predetermined assembly configuration with the orientation indicia of all tiles having an orientation indicium indicating the same rotational orientation; and
 wherein said plurality of apparatuses are releasably attachable to adjacent apparatuses, and
 wherein the physical movement of at least one of the apparatuses is different than the physical movement of at least one of the other apparatus such that the obstacle course comprises a plurality of different physical movements.

10. The obstacle course of claim 9 wherein each of the plurality of physical movements comprises a different animal movement than at least one of the other physical movements.

11. The obstacle course of claim 9 wherein each of the plurality of physical movements exercise a different muscle group than at least one of the other physical movements.

12. The obstacle course of claim 9 wherein each of the plurality of physical movements is designed to develop a different physical skill than the physical skill developed by at least one of the other physical movements.

13. The obstacle course of claim 11 wherein the plurality of different physical movements are each designed to work together so as to exercise all of the major muscle groups.

14. The instructional floor exercise apparatus of claim 1 wherein the uniformity aspect of each orientation indicium comprises the indicium's placement on the indicium's tile so that so that all of the indicia in the apparatus appear in the same general location of their respective tiles when the tiles are arranged in accordance with a predetermined physical movement.

15. The instructional floor exercise apparatus of claim 1 wherein the uniformity aspect of each orientation indicium comprises a graphic feature having directional aspect so that so that all of the indicia in the apparatus appear oriented in the same direction when the tiles are arranged in accordance with a predetermined physical movement.

\* \* \* \* \*